United States Patent
Carlson et al.

(10) Patent No.: US 10,897,505 B2
(45) Date of Patent: Jan. 19, 2021

(54) MANAGING TRANSMISSIONS FOR A WIRELESS SENSOR NETWORK DURING AIR TRANSPORT

(71) Applicant: Intel Corporation, Santa Clara, CA (US)

(72) Inventors: Christopher R. Carlson, Beaverton, OR (US); Greeshma Pisharody, Portland, OR (US); Rahul Khanna, Portland, OR (US); Arvind G. Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 15/721,697

(22) Filed: Sep. 29, 2017

(65) Prior Publication Data

US 2018/0338003 A1 Nov. 22, 2018

Related U.S. Application Data

(60) Provisional application No. 62/508,382, filed on May 18, 2017.

(51) Int. Cl.
*H04L 29/08* (2006.01)
*B64D 47/00* (2006.01)
(Continued)

(52) U.S. Cl.
CPC ............ *H04L 67/125* (2013.01); *B64D 47/00* (2013.01); *G06F 17/40* (2013.01); *H04W 4/38* (2018.02);
(Continued)

(58) Field of Classification Search
CPC ........ H04L 67/125; H04W 4/38; H04W 4/42; H04W 4/70; G06F 17/40
(Continued)

(56) References Cited

U.S. PATENT DOCUMENTS 7,389,164 B1 * 6/2008 Conner ................ G01C 5/005
701/14
7,791,455 B1 * 9/2010 MacLean, III .......... G01S 7/021
340/10.5
(Continued)

OTHER PUBLICATIONS

Blobel et al.; "Protocol options for low power sensor network MAC using wake-up receivers with duty cycling"; In: IEEE International Conference on Communications, ICC 2016; (May 2016); 6 pages; < doi: 10.1109/ICC.2016.7511318>.
(Continued)

*Primary Examiner* — Meng Vang
(74) *Attorney, Agent, or Firm* — Schiff Hardin LLP

(57) ABSTRACT

A technology is described for a wireless sensor network. An example method may include detecting an aircraft takeoff preparation event using cabin air pressure data and accelerometer data indicating that an aircraft is preparing for takeoff. Transmitting a listen command to sensor nodes included in a sensor network, the listen command instructing the sensor nodes to disable the wireless network transmissions and listen for commands transmitted by the gateway. Disabling gateway wireless transmissions to the sensor nodes and a computing network. Detecting a landing event using the cabin air pressure data and the accelerometer data indicating that the aircraft has landed. Enabling the gateway wireless transmissions to the sensor nodes and the computing network, and transmitting an enable command to the sensor nodes included in the sensor network, the enable command instructing the sensor nodes to enable the wireless network transmissions and resume sending sensor data to the gateway.

20 Claims, 12 Drawing Sheets

(51) Int. Cl.
| | |
|---|---|
| *G06F 17/40* | (2006.01) |
| *H04W 4/70* | (2018.01) |
| *H04W 4/42* | (2018.01) |
| *H04W 4/38* | (2018.01) |
| *H04W 84/18* | (2009.01) |
| *H04W 4/35* | (2018.01) |

(52) U.S. Cl.
CPC ............... *H04W 4/42* (2018.02); *H04W 4/70* (2018.02); *H04W 4/35* (2018.02); *H04W 84/18* (2013.01)

(58) Field of Classification Search
USPC .......................................................... 709/223
See application file for complete search history.

(56) References Cited

U.S. PATENT DOCUMENTS

| | | | | |
|---|---|---|---|---|
| 2009/0061897 | A1* | 3/2009 | Hamilton | G06Q 10/08 455/456.2 |
| 2009/0243895 | A1* | 10/2009 | Mitchell | H01Q 1/007 340/971 |
| 2010/0267375 | A1* | 10/2010 | Lemmon | G06F 21/74 455/418 |
| 2010/0279627 | A1* | 11/2010 | Bradley | H04W 48/04 455/69 |
| 2013/0214909 | A1* | 8/2013 | Meijers | H04W 4/029 340/10.5 |
| 2014/0153464 | A1* | 6/2014 | Emeott | H04W 52/0206 370/311 |
| 2015/0156254 | A1* | 6/2015 | Skaaksrud | H04W 12/06 709/223 |
| 2016/0095150 | A1* | 3/2016 | Howe-Ryberg | H04W 4/70 455/90.3 |
| 2016/0205500 | A1* | 7/2016 | Lee | H04W 4/02 455/456.4 |

OTHER PUBLICATIONS

BLUETOOTH® SIG, Inc.; "Bluetooth Technology Website"; Bluetooth; (2017); 4 pages; [retrieved on Jan. 10, 2018]; Retrieved from the Internet: <URL: https://www.bluetooth.com >.

Brunelli et al.; "Self-Powered WSN for Distributed Data Center Monitoring"; Sensors Journal; (Jan. 2016); 15 pages; vol. 16, No. 1, Article 57.

Buratti et al.; "Testing Protocols for the Internet of Things on the EuWIn Platform"; IEEE Internet of Things Journal; (Jul. 29, 2015); pp. 124-133; vol. 3, Issue 1; IEEE; < doi:10.1109/JIOT.2015.2462030 >.

Dandelski et al.; "Scalability of Dense Wireless Lighting Control Networks"; IEEE Communications Magazine; (Jan. 16, 2015); pp. 157-165; vol. 53, Issue 1; IEEE; < doi: 10.1109/MCOM.2015.7010529 >.

Dietrich et al.; "On the Lifetime of Wireless Sensor Networks"; ACM Transactions on Sensor Networks (TOSN); (Feb. 2009); 39 pages; vol. 5, No. 1, Article 5; < doi: 10.1145/1464420.1464425 >.

Du et al.; "Modeling and simulation of networked low-power embedded systems: a taxonomy"; EURASIP Journal on Wireless Communications and Networking; (2014); 12 pages; vol. 106.

Dunkels et al.; "Contiki—a Lightweight and Flexible Operating System for Tiny Networked Sensors"; In: IEEE International Conference on Local Computer Networks, 29$^{th}$ Annual Conference; (Nov. 16-18, 2004); 8 pages; < doi: 10.1109/LCN.2004.38 >.

Gamal; "On the Scaling Laws of Dense Wireless Sensor Networks: The Data Gathering Channel"; IEEE Transactions on Information Theory; (Mar. 2005); pp. 1229-1234; vol. 51, No. 3.

Khanna et al.; "Self-Organization of Sensor Networks Using Genetic Algorithms"; In: IEEE International Conference on Communication; ICC '06; (2006); < doi: 10.1109/ICC.2006.255594 >.

Khanna et al.; "Wireless Data Center Management: Sensor Network Applications and Challenges"; IEEE Microwave Magazine; (Nov. 14, 2014); pp. S45-S60; vol. 15, Issue 7; < doi: 10.1109/MMM.2014.2356151 >.

Kurt et al.; "Packet Size Optimization in Wireless Sensor Networks for Smart Grid Applications"; IEEE Transactions on Industrial Electronics; (Mar. 2017); pp. 2392-2401; vol. 64, Issue 3; < doi: 10.1109/TIE.2016.2619319 >.

Nguyen et al.; "Extensions of the IEEE802.15.4 Protocol for Ultra-Low Energy Real-Time Communication"; In: IEEE International Instrumentation and Measurement Technology Conference Proceedings (I2MTC); 2016 IEEE International; Taipei, Taiwan; IEEE; (May 23-26, 2016); < doi: 10.1109/I2MTC.2016.7520415 >.

Ruiz-Rosero et al.; "Firmware architecture to support Plug and Play sensors for IoT environment"; Memorias del VII Congreso Iberoamericano de Telematica CITA (2015); pp. 231-232.

Shih et al.; "Physical Layer Driven Protocol and Algorithm Design for Energy-Efficient Wireless Sensor Networks"; In: MobiCom: The ACM International Conference on Mobile Computing and Networking, 7$^{th}$ Annual Conference; (2001); 14 pages.

TELINK® Semiconductor Co, Ltd; (2011); 1 page; [retrieved on Jan. 10, 2018]; Retrieved from the Internet: <URL: http://www.telink-semi.com >.

WG802.15—Wireless Perosnal Area Network (WPAN) Working Group; 802.15.4-2015—"IEEE Standard for Low-Rate Wireless Networks (WPANs)"; IEEE Computer Society; (2016); 2 pages; Revision of IEEE Std 802.15.4-2011.

Xu et al.; "Hierarchical data aggregation using compressive sensing (HDACS) in WSNs"; ACM Transactions on Sensor Networks; (Feb. 2015); 45 pages; vol. 11, Issue 3; <doi: 10.1145/2700264 >.

ZIGBEE® Alliance; "Zigbee Technology Certified Product"; Zigbee Alliance; (2017); 2 pages; [retrieved on Jan. 10, 2018]; Retrieved from the Internet: <URL: http://www.zigbee.org >.

* cited by examiner

MANAGING TRANSMISSIONS FOR A WIRELESS SENSOR NETWORK DURING AIR TRANSPORT

PRIORITY DATA

This application claims the benefit of U.S. Provisional Application Ser. No. 62/508,382, filed on May 18, 2017, which is incorporated herein by reference.

BACKGROUND

Many governments and airlines prohibit the use of electronic devices configured to transmit radio frequency (RF) signals while inflight on commercial and non-commercial airlines. Due to these prohibitions, many devices include an airplane mode setting that when activated, suspends RF signal transmissions, resulting in disabling various radios, such as a cellular radio, WI-FI radio, and BLUETOOTH radio. Once airborne, some government regulations and airlines allow certain low-power device radios to be re-enabled, such as WI-FI and BLUETOOTH radios, while high-power device radios, such as cellular radios, remain disabled.

BRIEF DESCRIPTION OF THE DRAWINGS

Features and advantages of invention embodiments will be apparent from the detailed description which follows, taken in conjunction with the accompanying drawings, which together illustrate, by way of example, invention features; and, wherein.

DESCRIPTION OF EMBODIMENTS

Figure 1:
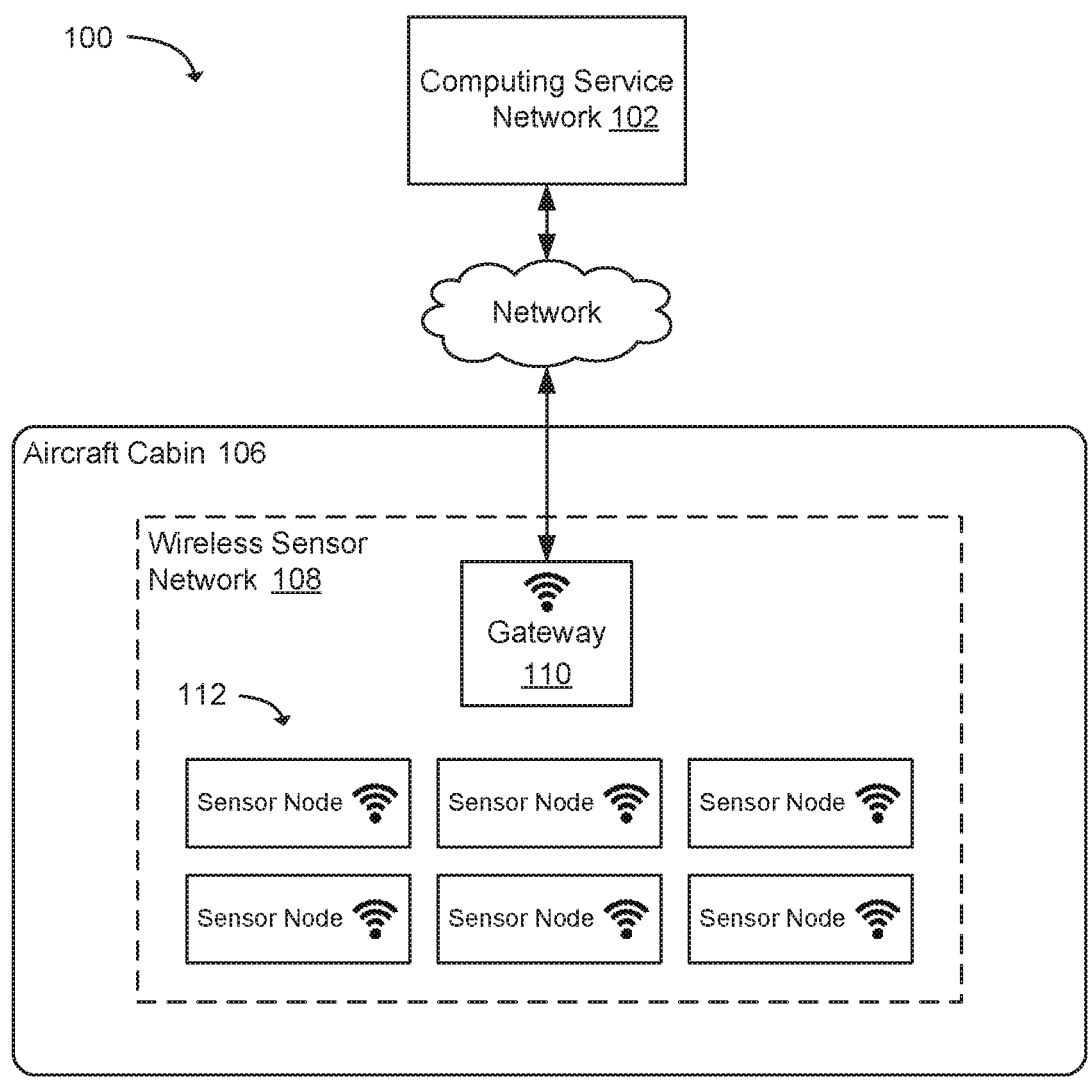
FIG. 1 is a block diagram illustrating a high-level example of a system for a wireless sensor network that includes a gateway configured to manage sensor network transmissions while inflight.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a network" includes a plurality of such networks.

Reference throughout this specification to "an example" means that a particular feature, structure, or characteristic described in connection with the example is included in at least one invention embodiment. Thus, appearances of the phrases "an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

A technology is described for managing network transmissions in a wireless sensor network based in part on flight related events detected using various sensors. The technology uses sensor data to detect flight related events and disable or enable wireless transmissions of devices included a wireless sensor network. For example, cabin air pressure data obtained from a pressure sensor can be used to detect takeoff and landing events of an aircraft based in part on the knowledge that modern high-altitude aircraft utilize a pressurized fuselage. Accelerometer sensor data can be used to: detect movement of an aircraft that indicates that the aircraft is taxiing to a runway for takeoff, and detect movement of the aircraft indicating that the aircraft has landed. Other types of sensor data can also be used to detect flight related events that result in disabling or enabling wireless transmissions of devices.

In one example, takeoff preparation can be detected using cabin air pressure data obtained from a pressure sensor included in a gateway device, or obtained from a flight data system included in an aircraft. For example, the cabin air pressure data may indicate an increase in cabin air pressure that is associated with pressurizing the aircraft prior to takeoff. In response to detecting takeoff preparation, the gateway device transmits a listen command to sensor nodes included in a wireless sensor network. The listen command instructs the sensor nodes to disable wireless network transmissions and listen for commands transmitted by the gateway device. Thereafter, the gateway device disables wireless transmissions sent by the gateway to the sensor nodes and an endpoint (e.g., a server or computing service network) that receives sensor data from the gateway device.

The cabin air pressure data can be used to detect a landing event. For example, the cabin air pressure data may indicate depressurization of the aircraft, indicating that the aircraft has landed and that cabin doors have been opened. In response to detecting that the aircraft has landed, gateway wireless transmissions may be enabled allowing the gateway device to send wireless transmissions to the sensor nodes and the computing service network. After enabling gateway wireless transmission, the gateway device transmits an enable command to the sensor nodes. The enable command instructs the sensor nodes to enable wireless network transmissions and resume sending sensor data to the gateway device, which can then forward the sensor data to an endpoint.

In the past, manual intervention was needed to set a device to an airplane mode that disabled one or more RF (Radio Frequency) radios included in the device. For items placed in a cargo cabin of an aircraft, manually setting devices to airplane mode can result in mistakes due to human error. For example, cargo workers loading items having attached sensor nodes into a cargo cabin of an aircraft may neglect to set a gateway device and/or the sensor nodes to airplane mode, or the cargo workers may forget to disable the airplane mode after unloading the items from the cargo cabin. As a result of the present technology, sensor data can be used to detect flight related events (e.g., events associated with takeoff, cruising, and landing), and in response to detecting a flight related event, an airplane mode can be enabled and disabled without human intervention, thereby reducing mistakes that can occur due to human error.

To further describe the technology, examples are now provided with reference to the figures. FIG. 1 is a diagram illustrating a high level example of a system 100 for a wireless sensor network 108 that includes a gateway device 110 configured to manage sensor network transmissions while inflight. The wireless sensor network 108 can include a gateway device 110 and a plurality of sensor nodes 112. The gateway device 110 may be in wireless network communication with the sensor nodes 112 and a computing service network 102, such as a "cloud" computing network. The sensor nodes 108 include one or more sensors (e.g., pressure sensor, temperature sensor, humidity sensor, tilt sensor, accelerometer sensor, etc.) configured to generate sensor data. The sensor nodes 108 send the sensor data to the gateway device 110, and the gateway device 110 is configured to forward the sensor data to the computing service network 102.

The wireless sensor network 108 can be used to track items and monitor environment conditions during transport of the items. As one example, sensor nodes 112 can be attached to high-value items and the sensor nodes 112 can transmit sensor data to a gateway device 110 configured to send the sensor data to a computing service network 102. The sensor data can be processed using the computing service network 102 to detect damage and/or theft of the items while the items are being shipped. For example, in the event that an item is dropped and potentially damaged, sensor data indicating that the item was dropped can be transmitted by a sensor node 112 associated with the item to the gateway device 110, which forwards the sensor data to the computing service network 102. The computing service network 102 may be configured to analyze the sensor data and determine that the item has been dropped. The computing service network 102 can then send a notification indicating that the item was dropped, thereby providing information about the condition of the item in response to receiving sensor data from the wireless sensor network 108.

In many cases, shipping items to a destination includes using an aircraft to transport the items. For example, items can be loaded into an aircraft cabin, such as a cargo hold, and flown to a destination. A wireless sensor network 108 can be used to track and monitor items shipped using an aircraft. The wireless sensor network 108 can be configured to detect flight related events and manage sensor network transmissions according to government and/or airline regulations that may not allow wireless transmission during a part, or an entirety of a flight. In one example, the wireless sensor network 108 can be configured to detect flight related events using sensor data generated by a sensor. For example, cabin air pressure data can be used to detect pressurization of an aircraft cabin 106 in preparation for takeoff and detect depressurization of the aircraft after landing. In detecting that an aircraft is being pressurized in preparation for takeoff, wireless transmissions for the wireless sensor network 108 can be disabled. For example, the gateway device 110 may send a command to the sensor nodes 112 instructing the sensor nodes 112 to disable RF network transmissions and listen for commands transmitted by the gateway device 110, whereupon the gateway device 110 disables gateway wireless transmissions. In detecting that the aircraft has landed, wireless transmissions for the wireless sensor network 108 can be re-enabled. For example, the gateway device 110 may re-enable gateway wireless transmissions and send instructions to the sensor nodes 112 to enable wireless transmissions and resume sending sensor data to the gateway device 110.

In another example, sensor data generated by different sensors can be used to detect flight related events. For example, cabin air pressure data and accelerometer data can be used to detect events related to takeoff and landing of an aircraft. For instance, preparation for takeoff of an aircraft can be detected using cabin air pressure data indicating pressurization of the aircraft and accelerometer data indicating movement associated with the aircraft taxiing to a runway, whereupon wireless transmissions for the wireless sensor network 108 can be disabled. Landing of the aircraft can be detected using cabin air pressure data indicating an increase in cabin air pressure associated with descent of the aircraft in preparation for landing, and accelerometer data indicating a rapid deceleration associated with landing on the runway, whereupon wireless transmissions for the wireless sensor network 108 can be re-enabled. As will be appreciated, other combinations of sensor data can be used to detect flight related events.

Figure 2:
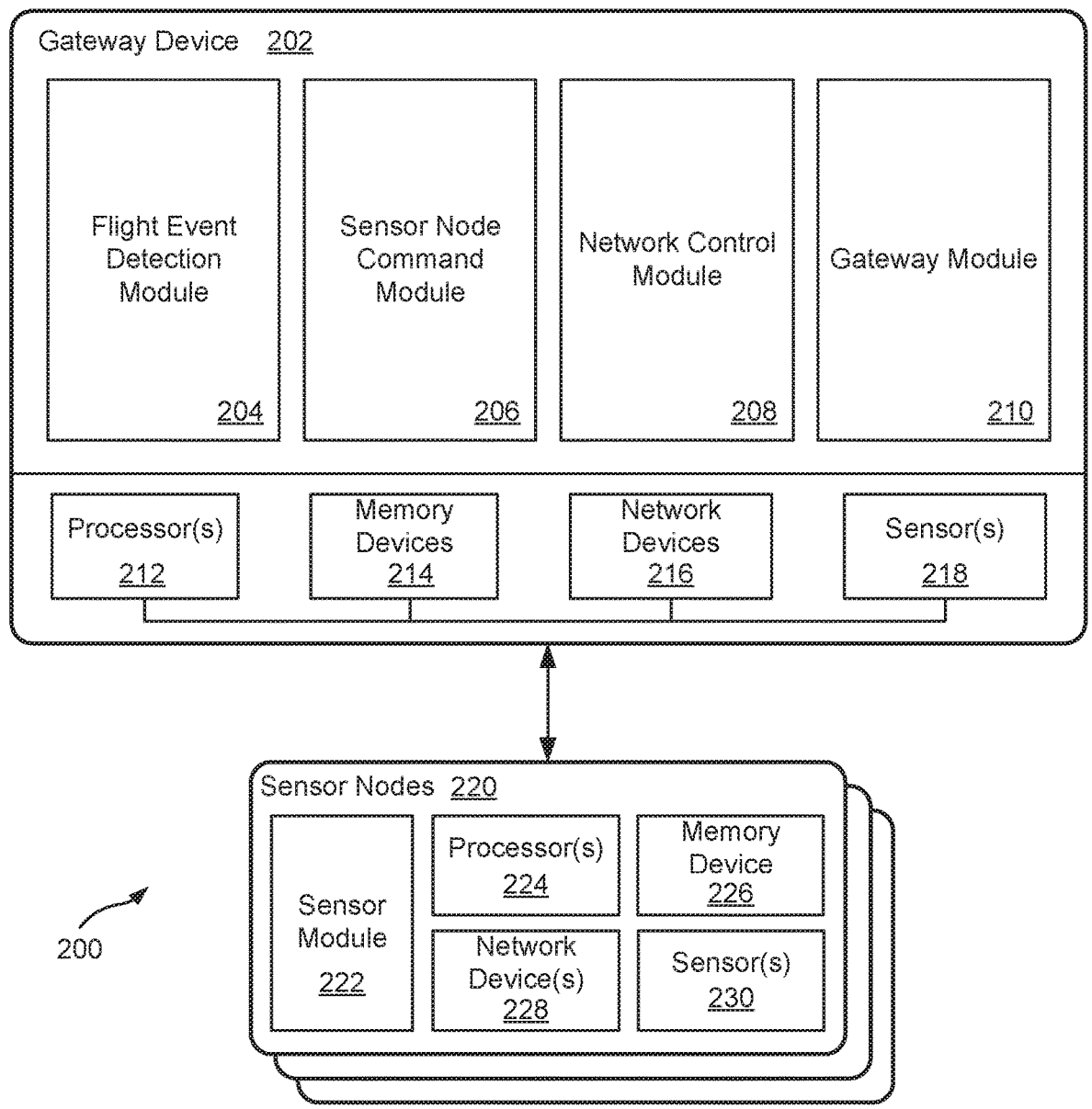
FIG. 2 is a block diagram that illustrates components of an example system on which the present technology may be executed.

FIG. 2 illustrates components of an example system 200 for a wireless sensor network on which the present technology may be executed. In one example, the system 200 can include a gateway device 202 and a plurality of sensor nodes 220. The gateway device 202 may be in network communication with the sensor node 220 and a computing service network. The gateway device 202 can include various modules configured to perform gateway functions. As illustrated, the gateway device 202 can include a gateway module 210, a flight event detection module 204, a sensor node command module 206, and a network control module 208.

The wireless sensor network can be used as part of a track and trace platform. For example, the gateway device and sensor nodes 220 can be deployed with a shipment of items. Sensor nodes 220 can be attached to the items, placed in boxes containing the items, or associated with the items such that the sensor nodes 220 can detect environmental conditions that may affect the items. In one example, a sensor node 220 can be scanned using a handheld scanner to obtain a node identifier for the sensor node 220 and the node identifier can be linked to the item. The sensor node 220 can then be activated and placed in a box containing the item. The same action can be performed for each item included in the shipment. A gateway device 202 can then be provisioned for the shipment. The gateway device 202 can then be activated and provided with information for the sensor nodes 220 included in the wireless sensor network. The gateway device 202 establishes network communication with the sensor nodes 220 and validates that the sensor nodes 220 are detected. Also, the gateway device 202 establishes network communication with an endpoint, such as a computing service network. Thereafter, the gateway device 202 can begin sending sensor data received from the sensor nodes 220 to the endpoint during transport of the items.

The gateway module 210 may be configured to perform management tasks associated with wireless sensor network, such as receive membership information for sensor nodes 220 included in the wireless sensor network that allows the sensor node 220 to communicate with the gateway device 202. The gateway module 210 may also be configured to receive sensor data from sensor nodes 220 and forward the sensor data to an endpoint, such as a computing service network. In some examples, the gateway module 210 may be configured to process sensor data received from sensor node 220. For example, the gateway module 210 may be configured to perform minimal sensor data processing. For example, the gateway module 210 may be configured to perform event analysis that analyzes sensor data to determine whether an anomaly has occurred and determine a significance of the anomaly. As another example, the gateway module 210 can be configured to perform data aggregation where sensor data received from sensor nodes 220 is aggregated and then sent to an endpoint.

In one example, the gateway module 210 may be configured to buffer sensor data received from sensor nodes 220 on the gateway device 202 during periods that gateway wireless network transmissions are disabled. After the gateway wireless network transmission is re-enabled, the gateway module 210 may be configured to send the buffered sensor data to an endpoint. For example, while an aircraft used to transport a shipment being tracked and monitored using a wireless sensor network is at a cruising altitude, sensor nodes 220 may be allowed to send sensor data to the gateway device 202 using low-power wireless transmissions. However, gateway wireless transmission may be disabled. As such, the gateway module 210 may be configured to buffer sensor data received from the sensor nodes 220 on a memory device 214 until gateway wireless transmissions are re-enabled, after which, the gateway module 210 sends the buffered sensor data to an endpoint.

The flight event detection module 204 may be configured to identify flight related events associated with takeoff, cruising, and landing using sensor data obtained from one or more sensors 218 included in the gateway device 202, or sensor data obtained from a different source, such as a flight data system included in an aircraft. A flight related event can be linked to a wireless transmission action that disables or enables wireless transmissions in a wireless sensor network. For example, a takeoff event can be linked to a wireless transmission action that disables wireless transmissions in a wireless sensor network, a cruise event can be linked to a wireless transmission action that enables low-power wireless transmissions, and a landing event can be linked to a wireless transmission action that re-enables wireless transmissions in the wireless sensor network. A flight related event can be identified by analyzing the sensor data for attributes associated with the flight related event using the methods described in association with FIGS. 4-6.

In one example, the flight event detection module 204 may be configured to detect a flight related event using sensor data and flight event reference data obtained from a flight event lookup table. The flight event lookup table may include a table of flight events (e.g., takeoff, landing, etc.) and air pressure values for various airports that are associated with the flight events. The flight event detection module 204, in one example, may be configured to compare cabin air pressure data to air pressure values obtained from the flight event lookup table to detect flight related events associated with takeoff, and landing of an aircraft, as described later in association with FIGS. 4-6. Because rate-dependent hysteresis may result in false detections of flight related events, a hysteresis function may be applied to relative air pressure values used to detect the flight related events. That is, because atmospheric pressure changes slowly relative to pressurization of an aircraft cabin, data sampling may be performed and a hysteresis function may be applied to mitigate false detections of the flight related events.

In one example, a flight event lookup table can be stored in a memory device 214 on the gateway device 202. In another example, the flight event detection module 204 may be configured to obtain data from a flight event lookup table stored on a computing service network. A flight event lookup table can be periodically updated to include relatively current data. For example, the flight event detection module 204 can be configured to request current atmospheric condition data for one or more airports from a server and update the flight event lookup table to include the current atmospheric condition data for the airports.

In detecting a flight related event, the flight event detection module 204 may identify a wireless transmission action linked to the flight related event and instruct the sensor node command module 206 and/or the network control module 208 to execute the wireless transmission action. For example, in detecting a takeoff preparation event, the flight event detection module 204 may identify a wireless transmission action linked to the takeoff preparation event that instructs sensor nodes 220 to set network devices 228 to a listen mode. The flight event detection module 204 can then send instructions to the sensor node command module 206 to execute the wireless transmission action.

The sensor node command module 206 may be configured to send commands associated with wireless transmission actions to the sensor nodes 220 in response to receiving instructions from the flight event detection module 204. Commands sent by the sensor node command module 206 to sensor nodes 220 may include, but are not limited to: a listen command that instructs sensor nodes 220 to set network devices 228 to a listen mode that disables wireless network transmissions and listens for commands transmitted by the gateway, an enable command that instructs sensor nodes 220 to enable network devices 228 and resume sending sensor data to the gateway device 202, and a low-power command that instructs sensor nodes 220 to enable low-power network devices 228 (e.g., BLUETHOOTH Low-Energy (BLE), 6LowPAN, ZIGBEE, etc.), while disabling other network device 228, and send sensor data to the gateway device 202 using the low-power network devices 228.

The network control module 208 may be configured to control network devices 216 included in the gateway device 202. For example, the network control module 208 can be used to enable and disable network devices 216 in response to receiving instructions from the flight event detection module 204. As an example, the network control module 208 may receive instructions from the flight event detection module 204 to disable network devices 216 in response to the flight event detection module 204 detecting a takeoff preparation event. In receiving the instructions, the network control module 208 may be configured to disable any network devices 216 included in the gateway device 202, thereby disabling gateway wireless network transmissions during takeoff of an aircraft.

The gateway device 202 may include a computing device having one or more processors 212, memory devices 214, network devices 216, and sensors 218. In one example, the gateway device 202 may comprise a microcontroller unit (MCU) that contains the processors 212, memory devices 214, network devices 216, and/or sensors. The modules described above can be implemented as firmware stored on a memory device 214. Also, the gateway device 202 can include a battery used to power the gateway controller. In one example, the network devices 216 can be configured to transmit and receive wireless transmissions using protocols that include, but are not limited to; cellular, NFC (Near Field Communication), WI-FI, BLUETOOTH, BLE, 6LowPAN, ZIGBEE. A network device 216 included in the gateway device 202 can be configured for MIMO (Multiple-Input-Multiple-Output). Sensor 218 included in the gateway device 202 can include, but are not limited to: a pressure sensor, a GPS (Global Positioning System) sensor, an accelerometer, a microphone, as well as other sensors.

A sensor node 220 may include a computing device comprising an MCU that includes a processor 224, memory device 226, network device 228, and sensors 230 and supporting circuitry. A network device 228 can be configured to transmit and receive wireless transmissions using the protocols described above. Also, a sensor node 220 can include a battery used to power the sensor node 220. Sensor 230 included in a sensor node 220 can include, but are not limited to: a pressure sensor, a GPS sensor, a temperature sensor, a humidity sensor, a tilt sensor, an accelerometer, a microphone, a magnetometer, a light sensor, and other sensors.

A sensor node 220 can include a sensor module 222 configured to send sensor data generated by a sensor 230 to the gateway device 202. In one example, the sensor node 220 can be configured to buffer sensor data in a memory device 226 during periods that wireless network transmissions are disabled, and send the buffered sensor data to the gateway device 202 after wireless network transmissions have been re-enabled. Further, the sensor module 222 can be configured to receive commands from the gateway device 202 that instruct the sensor module 222 to enable/disable a network device 228. In some examples, the sensor module 222 can be configured to perform the functions of the flight event detection module 204 described above. Namely, the sensor module 222 can be configured to detect flight related events using sensor data generated by a sensor 230 and perform a wireless transmission action linked to the flight related event. As such, each sensor node 220 included in a wireless sensor network can detect certain flight related events and manage wireless network transmissions accordingly. The sensor module 222 can be implemented as firmware stored on a memory device 226. While FIG. 2 illustrate one example of a system that may implement the techniques above, many other similar or different systems are possible. The example systems discussed and illustrated above are merely representative and not limiting.

Figure 3:
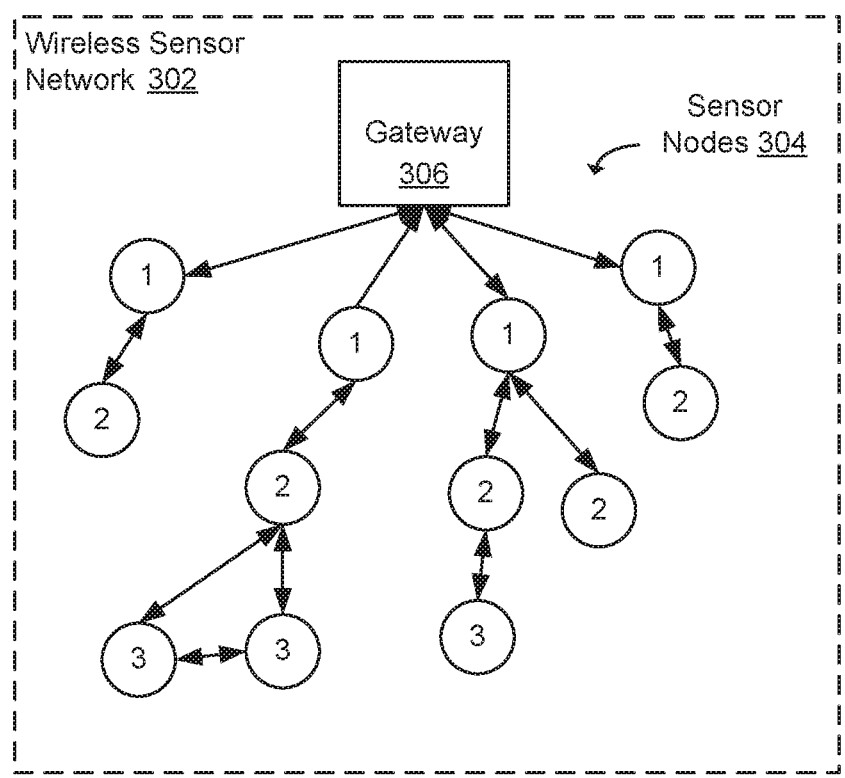
FIG. 3 is a block diagram illustrating an example wireless sensor network configured to use a mesh network for communications between sensor nodes.

FIG. 3 is a block diagram illustrating an example wireless sensor network 302 configured to use a mesh network topology for communications between sensor nodes 304. In one example, the wireless sensor network 302 may utilize the IEEE 802.15.4 standard (2.4 GHz) defining the operation of low-rate wireless personal area networks (LR-WPANs). Communications between a gateway 306 and the sensor nodes 304 can be wirelessly transmitted using the mesh network topology. For example, a command transmitted by the gateway 306 (e.g., listen commands, low-power radio commands, and enable radio commands, etc.) can be transmitted to a first sensor node group located within a broadcast range from the gateway 306. The first sensor node group can then re-transmit the command to a second sensor node group, and the second sensor node group can re-transmit the command to a third sensor node group, and so on until each sensor node 304 in the wireless sensor network 302 receives the command. Likewise, the sensor nodes 304 can transmit sensor data to the gateway 306 in the same manner. Although an example of a mesh network topology is shown, other network topologies can be used, such as a star network topology, tree network topology, and other network topologies.

Figure 4:
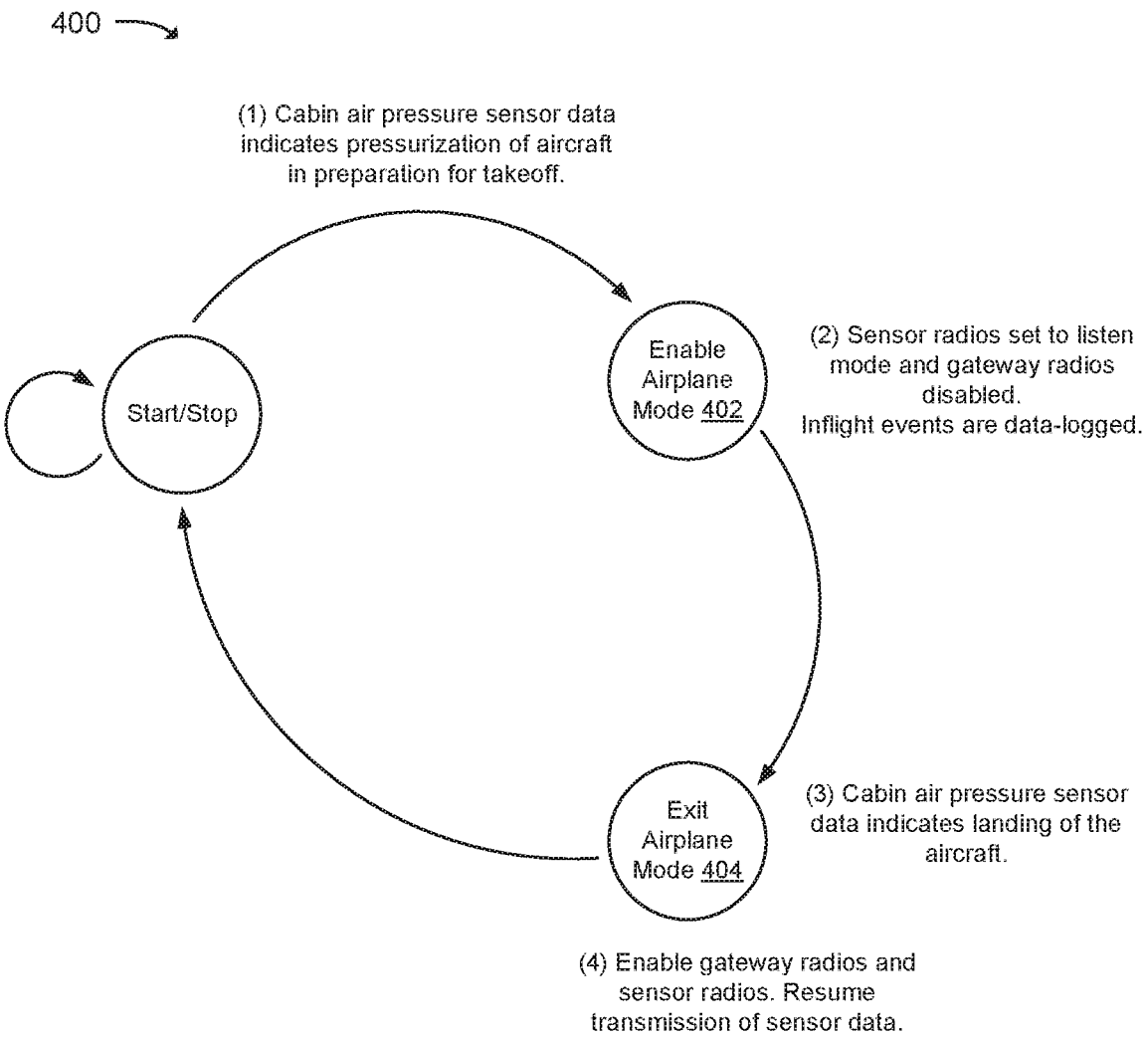
FIG. 4 is a flow diagram that illustrates an example method for managing network transmissions in a wireless sensor network based in part on flight events detected using cabin air pressure data.
Figure 8A:
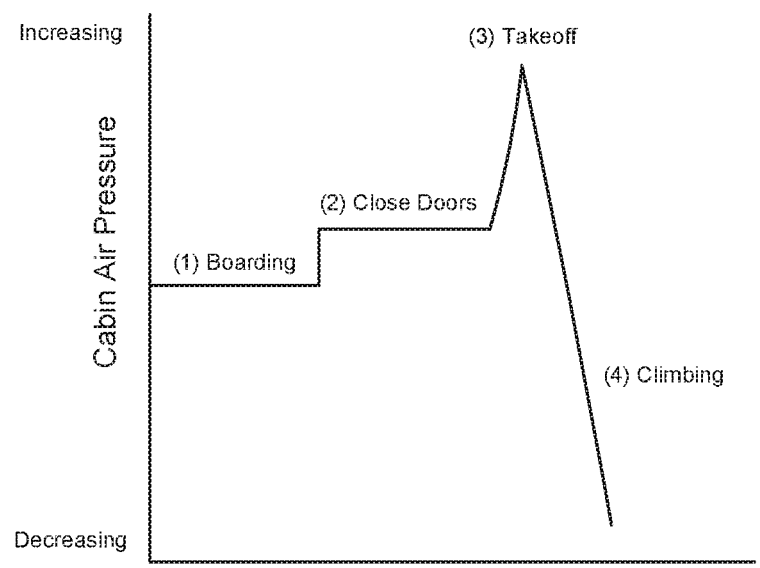
FIGS. 8*a*-8*c* are graphs illustrating increases and decreases in cabin air pressure associated with various aircraft flight events.
Figure 8B:
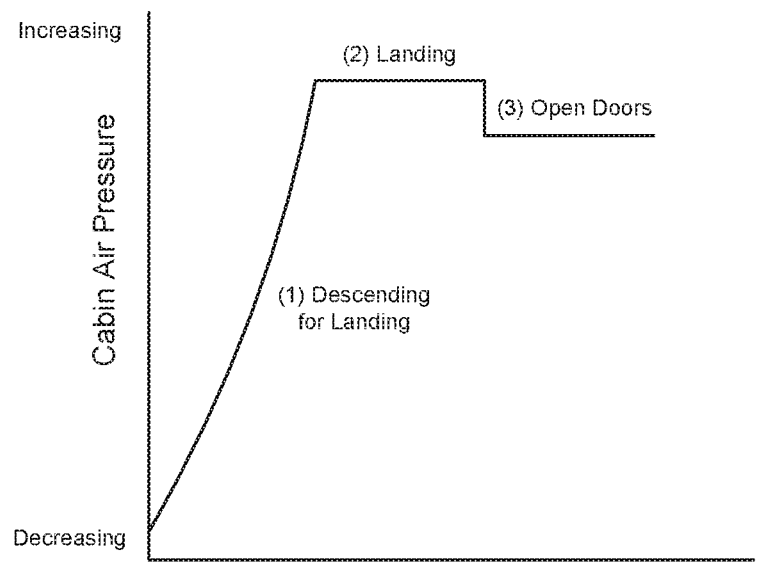

Moving now to FIG. 4, a flow diagram illustrates an example method 400 for managing wireless network transmissions in a sensor network using pressure sensor data. In the example illustrated, cabin air pressure sensor data can be analyzed to detect flight related events linked to changes in cabin air pressure. FIGS. 8a-b illustrate the effects of various flight related events on cabin air pressure of an aircraft. In particular, FIG. 8a shows an increase in cabin air pressure that results from closing the doors of an aircraft and pressurizing the aircraft in preparation for takeoff. During takeoff, the cabin air pressure increases, and then as the aircraft gains altitude, the cabin air pressure decreases in proportion to the altitude of the aircraft. FIG. 8b shows an increase in cabin air pressure that results in a descent in altitude of an aircraft in preparation for landing. The cabin air pressure increases until the aircraft lands, at which point the cabin air pressure becomes stable until the doors of the aircraft are opened and the cabin air pressure normalizes to ambient air pressure. The changes in cabin air pressure can be used to detect the various flight related events having an effect on the cabin air pressure.

Returning to FIG. 4, the method 400 can include detecting a takeoff preparation event by way of monitoring cabin air pressure for a spike in air pressure that is above ambient air pressure. The spike in air pressure may be linked to pressurization of an aircraft in preparation for takeoff of the aircraft. For example, an aircraft may pressurize cabins within the aircraft (e.g., cargo cabin, pilot cabin, passenger cabin, etc.) at the time that aircraft doors are closed in preparation for takeoff, causing the cabin air pressure to increase above ambient air pressure conditions. This increase in cabin air pressure can be detected by monitoring cabin air pressure data generated by a pressure sensor for a spike in cabin air pressure that corresponds to sealing the aircraft (closing the aircraft doors) and pressurizing the aircraft prior to takeoff.

In one example, cabin air pressure data can be monitored to detect an increase in cabin air pressure that exceeds a threshold and the increase in cabin air pressure occurs and is maintained over a finite period of time (e.g., 30 seconds, 60 seconds, 120 seconds, etc.). As an illustration, an increase in cabin air pressure over a base cabin air pressure value that meets or exceeds a threshold (e.g., 0.5 hPa, 0.7 hPa, 1 hPa, etc.) and the increase in cabin air pressure occurs and is maintained for a finite period of time (e.g., 30 seconds, 60 seconds, 120 seconds, etc.) may correspond to pressurization of the aircraft prior to takeoff. As a specific example, a sharp 0.5 hPa increase in cabin air pressure that lasts more than 1 minute may indicate pressurization of the aircraft.

In another example, pressurization of an aircraft associated with preparing for takeoff can be detected using cabin air pressure data obtained from a pressure sensor and atmospheric pressure data obtained from a flight event lookup table. The flight event lookup table may contain atmospheric pressure data associated with various airports, and the atmospheric pressure data for a particular airport may include, for example, an average, mean, or median atmospheric pressure, or an atmospheric pressure range for the airport. As an illustration, the flight event lookup table can be queried for atmospheric pressure data associated with the current airport location of a gateway device included in a wireless sensor network, where the airport location is determined using a GPS. The atmospheric pressure data obtained from the flight event lookup table can be compared to cabin air pressure data to determine whether an increase in air cabin pressure over the atmospheric pressure data corresponds to pressurization of the aircraft in preparation for takeoff. Alternatively, current atmospheric conditions for an airport can be obtained from a flight data system included in an aircraft and can be used in combination with cabin air pressure data to detect an aircraft takeoff preparation event.

After detecting an aircraft takeoff preparation event that indicates that the aircraft is preparing for takeoff, an airplane mode can be enabled 402 that sets sensor radios (e.g., WI-FI, BLE, etc.) included in sensor nodes to a listen mode and disables gateway radios (e.g., cellular, WI-FI, BLE, etc.). For example, in detecting the aircraft takeoff preparation event, a gateway device transmits a listen command to sensor nodes included in a wireless sensor network. The listen mode instructs the sensor nodes to disable wireless network transmissions and listen for further commands transmitted by the gateway device. The gateway device then disables the gateway's own radios until the gateway device detects an aircraft landing event. While in listen mode, the sensor nodes data-log sensor data in storage on the sensor nodes until sensor radios are re-enabled, at which time the sensor nodes may transmit the data-logged sensor data to the gateway device.

While the aircraft is inflight, cabin air pressure drops proportional to the altitude of the aircraft. During descent of the aircraft, the cabin air pressure increases proportional to the descent rate of the aircraft. Using these principles of cabin air pressure variances, cabin air pressure data can be used to detect that an aircraft is preparing to land, and detect that the aircraft has in fact landed. Thus, cabin air pressure sensor data can be analyzed to detect an aircraft landing event that indicates that an aircraft has landed. In one example, cabin air pressure data can be monitored to detect an increase in cabin air pressure associated with a descent in altitude of the aircraft and a normalization of cabin air pressure associated with landing of the aircraft. These data points (i.e., an increase in cabin air pressure and normalization of cabin air pressure), as well as other data points, can be used to determine that an aircraft has landed.

In one example, a descent in altitude of the aircraft can be detected by monitoring cabin air pressure for a linear increase in cabin air pressure that corresponds to a rate of descent. For example, a linear increase in cabin air pressure that meets or exceeds a threshold and the increase occurs over a finite period of time (e.g., an increase of at least 10 hPa occurring every 10 minutes) can be detected and can be used as a first indication that the aircraft is preparing to land. In detecting the descent of the aircraft providing the first indication that the aircraft is preparing to land, cabin air pressure data can then be monitored for further indications that the aircraft is preparing to land, or has in fact landed.

A second indication that the aircraft is approaching an airport to land can include analyzing cabin air pressure data to determine whether the cabin air pressure falls within a range of atmospheric conditions for an airport. For example, atmospheric pressure data for one or more airports can be obtained from a flight event lookup table stored on a gateway device and the atmospheric pressure data can be compared to the most recent cabin air pressure data for the aircraft. In the case that the cabin air pressure is within a range of the atmospheric pressure data for an airport (e.g., within 10-20 hPa), the correlation can provide a second indication that the aircraft is in the process of landing.

An indication that the aircraft has landed can include detecting the normalization of cabin air pressure. For example, cabin air pressure data can be monitored to detect that cabin air pressure has stabilized (i.e., there are no significant increases or decreases in cabin air pressure over a finite period of time). Another indication that the aircraft has landed can include detecting that the aircraft doors have opened and that cabin air pressure is equalized to ambient atmospheric conditions. That is, after landing and taxiing to a stop, the doors of the aircraft are opened and cabin air pressure equalizes to an ambient air pressure. Cabin air pressure data can be monitored to detect the release in cabin air pressure (i.e., a decrease in cabin air pressure) that indicates that the aircraft doors have been opened.

The detection of one or more indications that the aircraft is preparing to land, followed by one or more indications that the aircraft has in fact landed can be used to determine that it is safe to exit the airplane mode 404 re-enabling gateway radios and the sensor radios. For example, in detecting that the aircraft has landed, the gateway device may enable the gateway device's radio and send instructions to the sensor nodes to enable their radios and resume transmission of sensor data to the gateway device. After receiving the instructions, the sensor nodes enable wireless network transmissions and send any buffered sensor data stored on the sensor nodes to the gateway device and resume sending newly generated sensor data to the gateway device.

Figure 5:
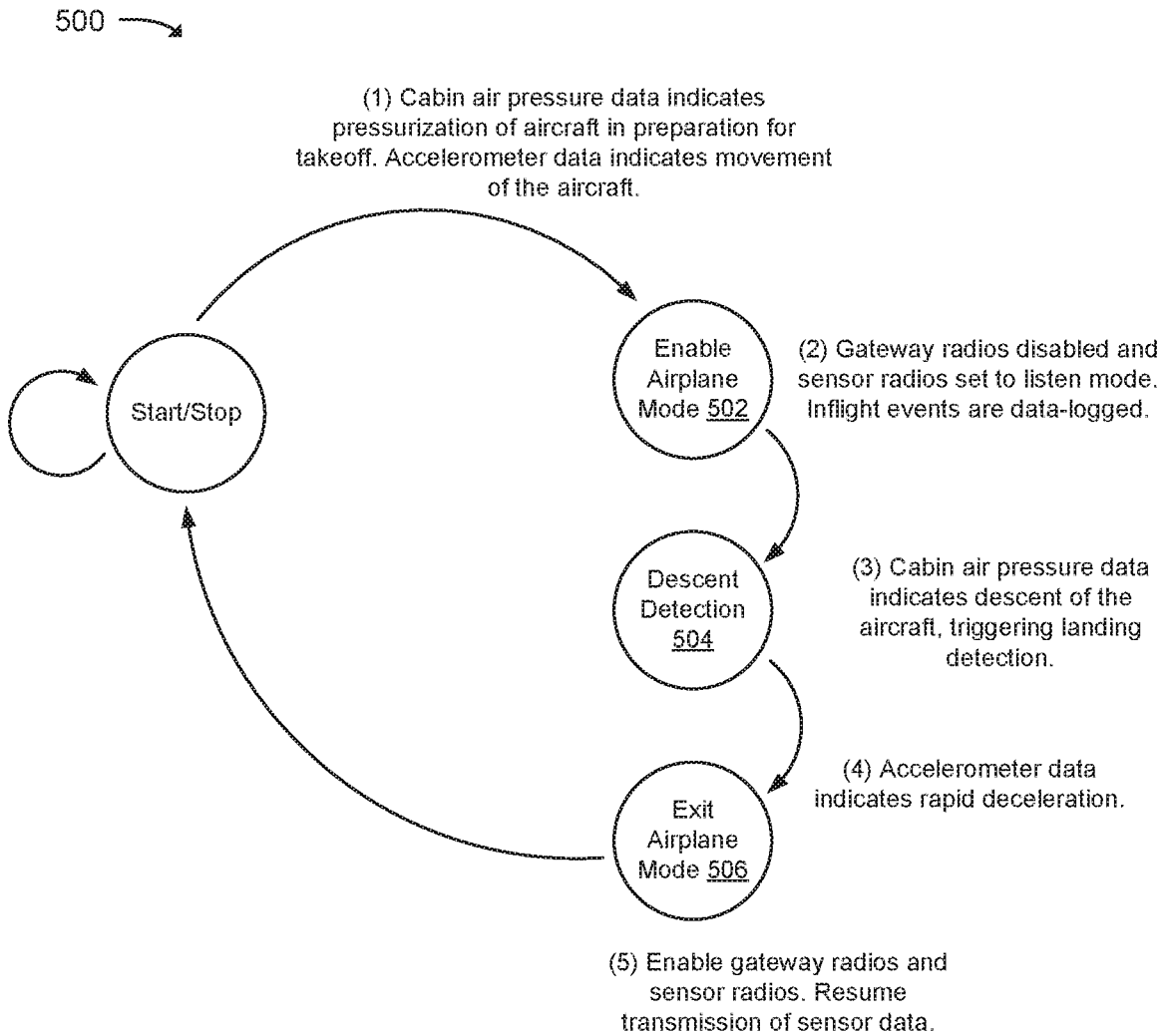
FIG. 5 is a flow diagram illustrating an example method for managing network transmissions in a wireless sensor network based in part on flight events detected using cabin air pressure data and accelerometer data.

FIG. 5 is a flow diagram illustrating an example method 500 for managing wireless network transmissions in a wireless sensor network while inflight using both cabin air pressure sensor data and accelerometer data. Like the method shown in FIG. 4, the method 500 can include detecting flight related events (e.g., preparation for takeoff, descending for landing, and landing) using air cabin pressure data. In addition, the method 500 uses accelerometer data to detect events associated with takeoff and landing of an aircraft. For instance, accelerometer data can be used to detect movement of an aircraft associated with taxiing to a runway in preparation for takeoff, and to detect rapid deceleration associated with landing on a runway.

In one example, indications provided by cabin air pressure data and accelerometer data can be combined to detect a flight related events. In the example illustrated in FIG. 5, preparation of an aircraft for takeoff can be detected using cabin air pressure data indicating pressurization of an aircraft followed by accelerometer data indicating movement of the aircraft taxiing out to a runway. In making the determination, an airplane mode can be enabled 502 that causes a gateway device to send sensor devices instructions to disable wireless network transmissions and listen for commands transmitted by the gateway device. The gateway device then disables gateway wireless transmissions to the sensor nodes and any external networks.

Preparation for landing of the aircraft can be detected using cabin air pressure data that indicates that the aircraft is descending 504, triggering aircraft landing detection that causes accelerometer data to be monitored for rapid deceleration of the aircraft associated with touching down on a runway. Cabin air pressure data can then be monitored for normalization of cabin air pressure data associated with landing at an airport, as well as equalization of cabin air pressure data associated with the opening of airplane doors. Having detected that the aircraft has landed, the gateway device determines that it is safe to exit airplane mode 506, re-enabling gateway radios and sending instructions to the sensor nodes to enable their radios and resume transmission of sensor data to the gateway device. Illustratively, most commercial airports are located below 10,000 feet, with a few exceptions in the Himalayas. With this in mind, a significant increase in cabin air pressure may occur after an aircraft has descended below 10,000 feet. This increase in cabin air pressure can be detected and the airplane mode can be enabled. Monitoring of cabin air pressure can continue while monitoring accelerometer data for a deceleration associated with landing of the aircraft, whereupon the airplane mode can be exited.

Figure 6:
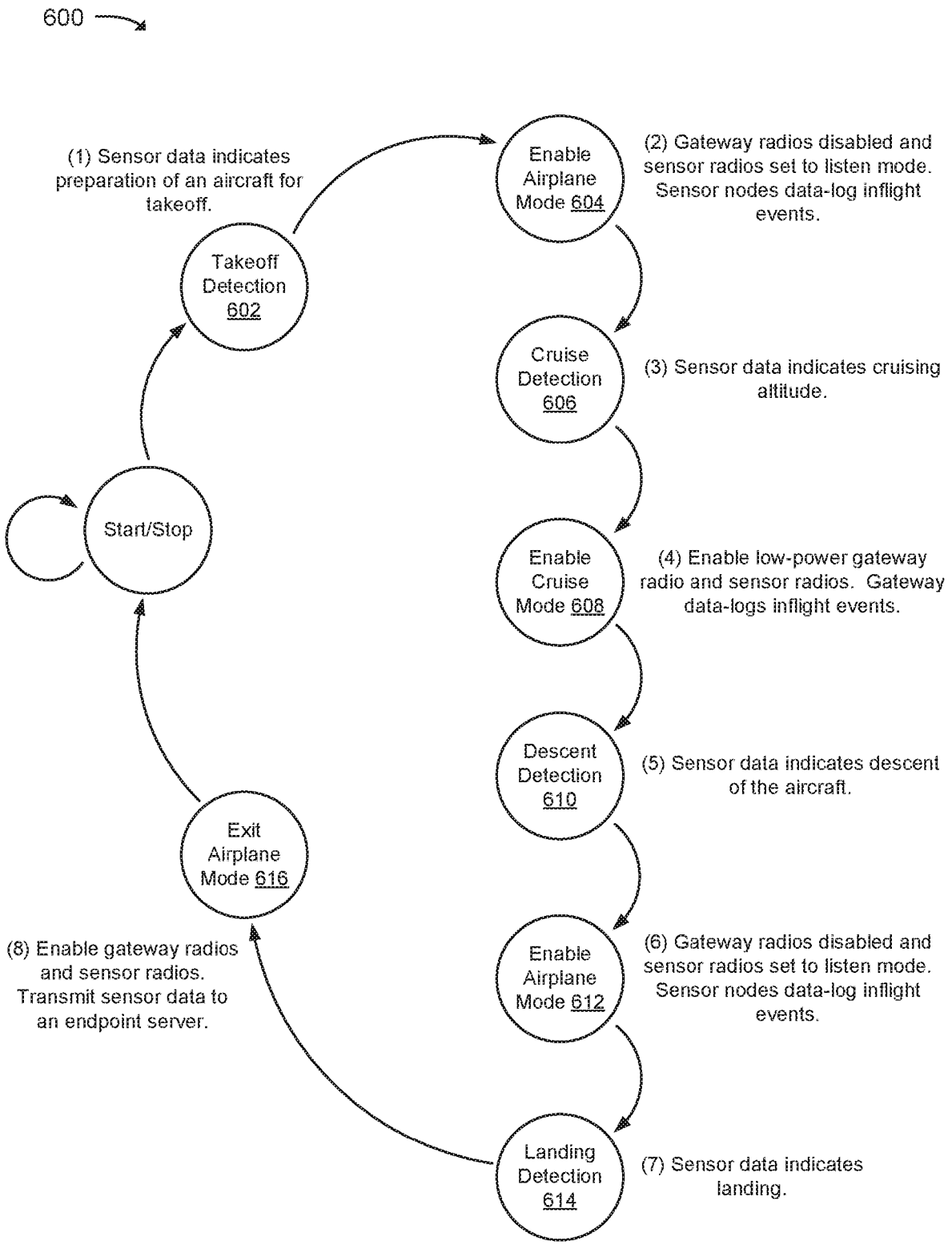
FIG. 6 is a flow diagram that illustrates an example method for managing network transmissions in a wireless sensor network using an airplane mode and a cruise mode.

FIG. 6 is a flow diagram that illustrates an example method 600 for managing network transmissions in a wireless sensor network while inflight using an airplane mode and a cruise mode. The method 600 can include detecting flight related events associated with takeoff and landing of an aircraft as described in association with FIGS. 4-5. In addition, the method 600 includes detecting a cruising event and enabling a cruise mode that enables low-power gateway device and sensor node radios, allowing sensor nodes to transmit sensor data to the gateway device.

In the example illustrated, preparation of an aircraft for takeoff can be detected 602 using sensor data as described earlier, after which an airplane mode can be enabled 604 that causes sensor node radios to be set to a listen mode and disables gateway radios. That is, the gateway device sends a listen command to sensor nodes that instructs the sensor nodes to disable wireless network transmissions and listen for commands transmitted by the gateway device, and the gateway device disables gateway wireless transmissions. While airplane mode is enabled, sensor data generated by a sensor node can be stored on the sensor node.

Aircraft flights typically include three phases, climbing, cruising, and descending. The cruising phase includes reaching a cruising altitude and traveling at a near constant speed and altitude. During the cruising phase of a flight, government regulations and airline policies may allow certain low-power device radios to be re-enabled, such as WI-FI and BLUETOOTH, or 802.15 low-power 2.4 GHz radios, while high-power device radios, such as cellular radios, remain disabled.

Figure 8C:
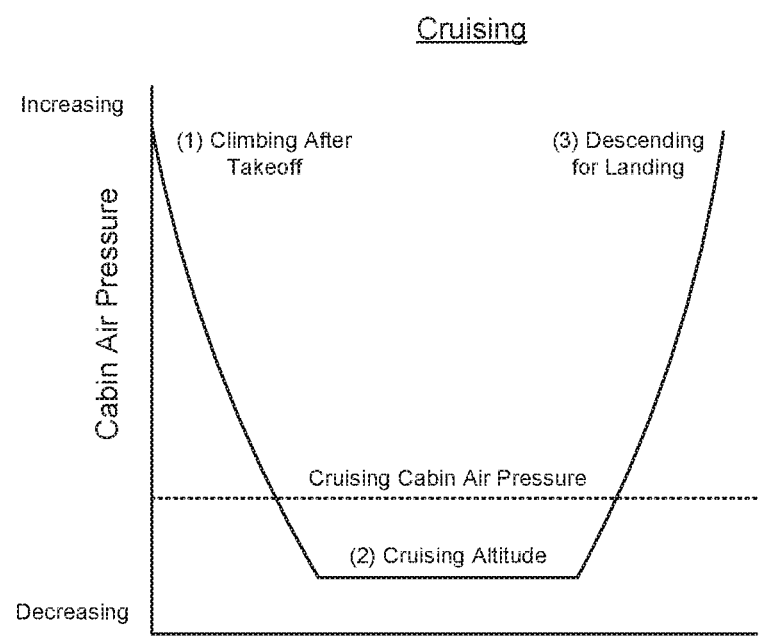

After takeoff of the aircraft, cabin air pressure data can be monitored to detect a cruising event that indicates that it is safe to re-enable low-power radios in the wireless sensor network. In one example, a cruising event may include a cabin air pressure that corresponds to a cruising altitude (e.g., an altitude above 10,000 ft.) of an aircraft. As described earlier, cabin air pressure decreases in proportion to the altitude of an aircraft. Consequently, as an aircraft climbs to a cruising altitude, cabin air pressure decreases proportionally as shown in FIG. 8c, allowing cabin air pressure to be used to detect that a cruising altitude threshold has been met. As such, cabin air pressure data can be monitored to detect when an aircraft has reached a cruising altitude that allows low-power radios to be re-enabled. As a non-limiting example, cabin air pressure data can be monitored to detect when cabin air pressure is below a threshold that corresponds to an altitude above 10,000 ft.

After detecting a cruising event 606, the gateway device can enable a cruise mode 608 by transmitting a low-power command to the sensor nodes included in a sensor network that instructs the sensor nodes to enable low-power wireless network transmissions. The gateway device can then receive sensor data from the sensor nodes via the low-power wireless network transmissions. Sensor data received from the sensor nodes can be stored to local storage on the gateway device until a time that communication with an endpoint, such as a computing service network, can be reestablished.

Cabin air pressure data may be continually monitored while cruise mode is enabled to detect descent 610 of the aircraft in preparation for landing. In descending, cabin air pressure increases as shown in FIG. 8c. As such, cabin air pressure data can be monitored to detect an increase in cabin air pressure that is above a threshold that corresponds to an altitude at which wireless sensor network radios need to be disabled. As a non-limiting example, cabin air pressure data can be monitored to detect when cabin air pressure is above a threshold that corresponds to an altitude below 10,000 ft.

In detecting the descent of the aircraft, the gateway device can enable the airplane mode 612 by sending a listen command to the sensor nodes, instructing the sensor nodes to disable wireless network transmissions (including low-power network transmissions) and listen for commands transmitted by the gateway device. The gateway device then disables gateway wireless network transmissions until landing of the aircraft has been detected.

Landing of the aircraft can be detected 614 using sensor data as described earlier. Having detected that the aircraft has landed, the gateway device may exit airplane mode 616 by re-enabling gateway radios and transmitting an enable command to the sensor nodes that instructs the sensor nodes to enable wireless network transmissions and resume sending sensor data, including buffered sensor data stored on the sensor nodes to the gateway device. The gateway device can then send sensor data received from the sensor nodes and sensor data buffered to the gateway device during the flight to an endpoint server.

Figure 7:
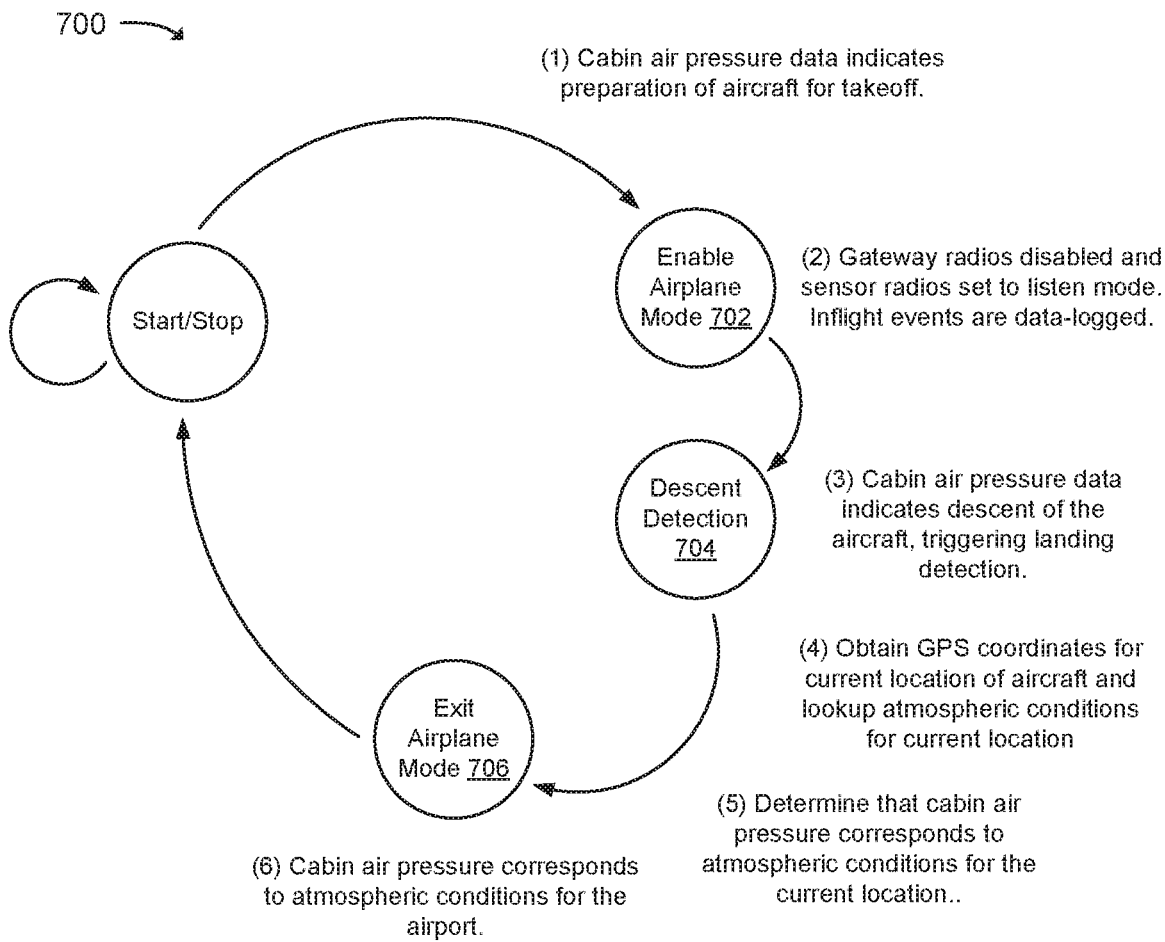
FIG. 7 is a flow diagram illustrating an example method for managing network transmissions in a wireless sensor network using cabin air pressure data and GPS data.

FIG. 7 is a flow diagram illustrating an example method 700 for managing network transmissions in a wireless sensor network using cabin air pressure data and GPS data. The method 700 can include detecting flight related events associated with takeoff and landing of an aircraft as described earlier. In addition, the method 700 includes detecting a landing event by comparing cabin air pressure data to stored atmospheric conditions for an airport.

In the example illustrated, an airplane mode can be enabled 702 when cabin air pressure data indicates that an aircraft is being prepared for takeoff. While inflight, cabin air pressure data can be monitored to detect a descent 704 of the aircraft in preparation for landing. Detecting descent of the aircraft triggers landing detection, which can include obtaining GPS coordinates for a current location of the aircraft. In one example, a gateway device can include a GPS sensor. The GPS sensor may remain enabled in airplane mode because a GPS sensor typically does not transmit RF signals. Coordinates of the aircraft can be obtained from the GPS sensor and the coordinates can be used to query an airport lookup table for an airport that is closest to the coordinates. In one example, coordinates for the location of the aircraft can be updated as the aircraft prepares to land and the airport lookup table can be re-queried to determine whether a different airport is now closer. Stored atmospheric conditions for an airport can be obtained from the airport lookup table. In one example, stored atmospheric conditions comprise an average, mean, or median atmospheric pressure, or an atmospheric pressure range for the airport. In another example, stored atmospheric conditions for an airport can include last known atmospheric conditions for airports, which can be periodically updated over a network (e.g., the Internet) when available.

After obtaining stored atmospheric conditions for an airport that is closest to the current location of the aircraft, cabin air pressure data can be monitored to determine whether the cabin air pressure is substantially the same as the stored atmospheric conditions. In the case that the cabin air pressure data indicates that the cabin air pressure is substantially the same as the stored atmospheric conditions, a determination can be made that the aircraft has landed and the airplane mode can be exited 706 allowing network transmissions to be re-enabled in the wireless sensor network.

Figure 9:
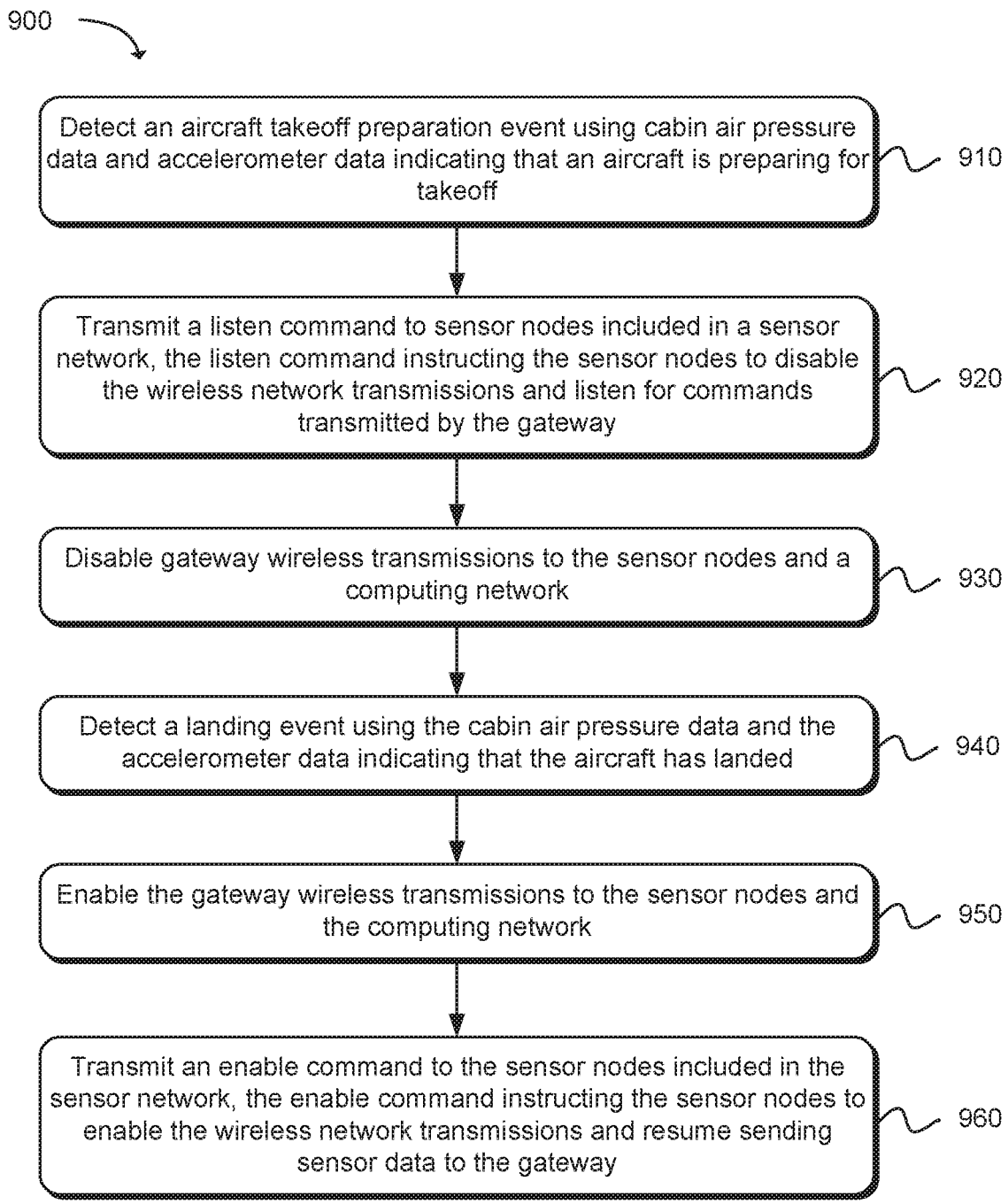
FIG. 9 is a flow diagram illustrating an example method for managing network transmissions of a wireless sensor network according to flight events.

FIG. 9 is a flow diagram illustrating an example method 900 for managing wireless network transmissions during air transport using a gateway. As in block 910, an aircraft takeoff preparation event can be detected using cabin air pressure data and accelerometer data indicating that an aircraft is preparing for takeoff. As in block 920, a listen command can be transmitted to sensor nodes included in a sensor network, the listen command instructing the sensor nodes to disable the wireless network transmissions and listen for commands transmitted by the gateway, and as in block 930, gateway wireless transmissions to the sensor nodes and the computing network are disabled.

As in block 940, a landing event can be detected using the cabin air pressure data and the accelerometer data indicating that the aircraft has landed. As in block 950, the gateway wireless transmissions to the sensor nodes and the computing network are enabled. As in block 960, an enable command can be transmitted to the sensor nodes included in the sensor network, where the enable command instructs the sensor nodes to enable the wireless network transmissions and resume sending sensor data to the gateway.

Figure 10:
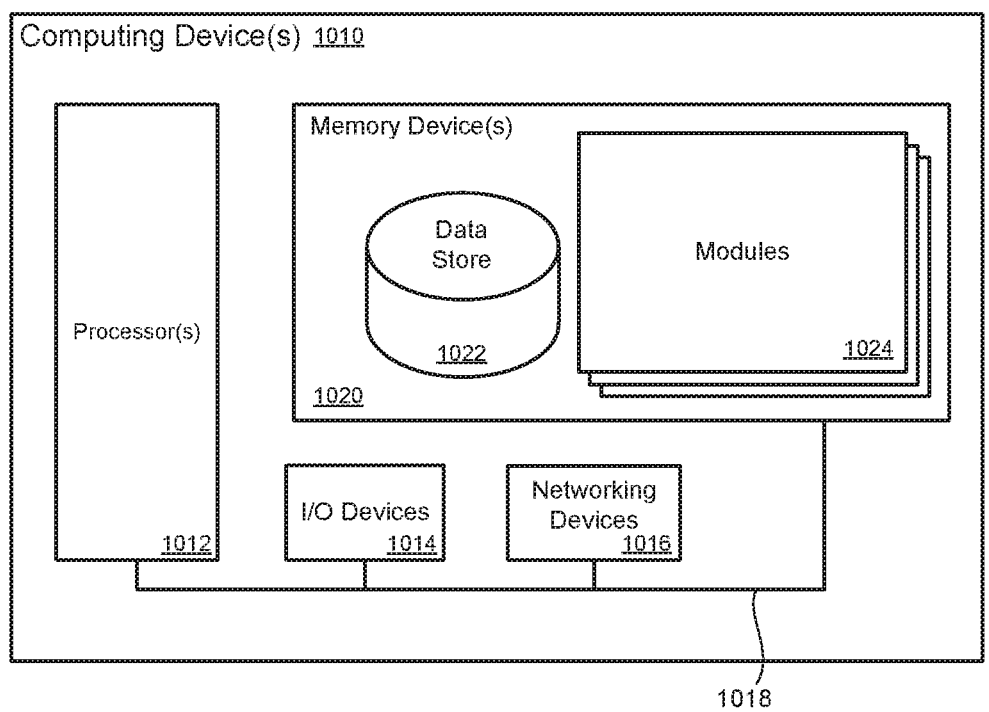
FIG. 10 is block diagram illustrating an example of a computing device that may be used to execute a method for managing network transmissions of a wireless sensor network during air transport.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. For example, the memory device 1020 can include a gateway module, a flight event detection module, a sensor node command module, a network control module, and other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high level programming languages that are compiled, interpreted or executed using a hybrid of the methods.

The computing device 1010 may also have access to I/O (input/output) devices 1014 that are usable by the computing device 1010. Other known I/O devices may be used with the computing device 1010 as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described herein may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Examples

The following examples pertain to specific invention embodiments and point out specific features, elements, or steps that can be used or otherwise combined in achieving such embodiments.

In one example there is provided, an apparatus for a gateway included in a sensor network, the apparatus comprising one or more processors and memory configured to: detect an aircraft takeoff preparation event using cabin air pressure data indicating that an aircraft is preparing for takeoff;

instruct sensor nodes included in the sensor network to disable wireless network transmissions and listen for commands transmitted by the gateway;

disable gateway wireless transmissions to the sensor nodes and a computing network;

detect an aircraft landing event using the cabin air pressure data indicating that the aircraft has landed;

enable the gateway wireless transmissions to the sensor nodes and the computing network; and instruct the sensor nodes to enable the wireless network transmissions and resume sending sensor data to the gateway.

In one example of the apparatus for a gateway included in a sensor network, the one or more processors and memory are further configured to:

receive the sensor data from the sensor nodes configured with at least one sensor, wherein the sensor nodes are in proximity to items being transported and the sensor data is used to track the items and monitor conditions of the items during transport; and forward the sensor data received from the sensor nodes to the computing network using the wireless transmissions.

In one example of the apparatus for a gateway included in a sensor network, the one or more processors and memory are further configured to:

receive buffered sensor data from the sensor nodes configured to record sensor data and store the sensor data to local storage on the sensor nodes during a time that the wireless network transmissions are disabled; and forward the buffered sensor data to the computing network using the wireless transmissions.

In one example of the apparatus for a gateway included in a sensor network, the cabin air pressure data associated with the takeoff preparation event indicates an air pressure increase that corresponds to sealing the aircraft prior to takeoff.

In one example of the apparatus for a gateway included in a sensor network, the cabin air pressure data for the landing event indicates a cabin air pressure that corresponds to an ambient air pressure of a destination airport.

In one example of the apparatus for a gateway included in a sensor network, the cabin air pressure data for the landing event indicates equalization of the cabin air pressure with an ambient air pressure.

In one example of the apparatus for a gateway included in a sensor network, the one or more processors and memory are further configured to receive the cabin pressure data from a pressure sensor included in the gateway.

In one example of the apparatus for a gateway included in a sensor network, the one or more processors and memory are further configured to receive the cabin pressure data from a flight data system included in the aircraft.

In one example of the apparatus for a gateway included in a sensor network, the one or more processors and memory are further configured to reference air pressure values in a cabin pressure lookup table stored on the gateway to determine that an event has occurred, wherein the air pressure values correspond to individual events.

In one example of the apparatus for a gateway included in a sensor network, the cabin pressure lookup table further includes air pressure values associated with airports, where the air pressure values are used as part of determining that an event has occurred.

In one example there is provided, a method for managing wireless network transmissions during transport using a gateway, comprising:

detecting an aircraft takeoff preparation event using cabin air pressure data and accelerometer data indicating that an aircraft is preparing for takeoff;

transmitting a listen command to sensor nodes included in a sensor network, the listen command instructing the sensor nodes to disable the wireless network transmissions and listen for commands transmitted by the gateway;

disabling gateway wireless transmissions to the sensor nodes and a computing network;

detecting a landing event using the cabin air pressure data and the accelerometer data indicating that the aircraft has landed;

enabling the gateway wireless transmissions to the sensor nodes and the computing network; and transmitting an enable command to the sensor nodes included in the sensor network, the enable command instructing the sensor nodes to enable the wireless network transmissions and resume sending sensor data to the gateway.

In one example of the method for managing wireless network transmissions during transport using a gateway, detecting the takeoff preparation event further comprises:

monitoring the cabin air pressure data to detect an increase in cabin air pressure occurring over a time period that indicates the aircraft has been sealed in preparation for takeoff; and monitoring the accelerometer data to detect movement of the aircraft associated with the aircraft taxiing to a runway In one example of the method for managing wireless network transmissions during transport using a gateway, the method further comprises:

detecting a cruising pressurization event using the cabin air pressure data indicating an altitude that corresponds to a cruising altitude of the aircraft; and transmitting a low-power command to the sensor nodes included in a sensor network, the low-power command instructing the sensor nodes to enable low-power wireless network transmissions.

In one example of the method for managing wireless network transmissions during transport using a gateway, the method further comprises:

receiving the sensor data from the sensor nodes via the low-power wireless network transmissions;

buffering the sensor data to local storage on the gateway; and forwarding the sensor data to a computing network after enabling wireless network transmissions with the computing network.

In one example of the method for managing wireless network transmissions during transport using a gateway, the method further comprises:

detecting a decent pressurization event using the cabin air pressure data indicating a decent of the aircraft in preparation for landing; and transmitting the listen command to the sensor nodes instructing the sensor nodes to disable the low-power wireless network transmissions and listen for commands transmitted by the gateway.

In one example of the method for managing wireless network transmissions during transport using a gateway, detecting the cruising pressurization event further comprises:

receiving the cabin air pressure data from a pressure sensor; and determining that the cabin air pressure data meets an air pressure threshold that corresponds to the cruising altitude of the aircraft.

In one example of the method for managing wireless network transmissions during transport using a gateway, detecting the landing event further comprises:

monitoring the cabin air pressure data to detect an increase in cabin air pressure corresponding to a decrease in altitude of the aircraft in preparation for landing; and monitoring the accelerometer data to detect rapid deceleration of the aircraft that corresponds to a landing of the aircraft.

In one example there is provided, system for monitoring transport of items using a sensor network, comprising:

a gateway device having at least one processor and memory configured to:

monitor cabin air pressure data to detect pressurization of an aircraft as part of preparing the aircraft for takeoff;

transmit a listen command to sensor nodes included in the sensor network in response to detecting the pressurization of the aircraft, wherein the listen command instructs the sensor nodes to disable wireless network transmissions and listen for an enable command transmitted by the gateway device;

disable gateway wireless transmissions to the sensor nodes and a computing network;

monitor the cabin air pressure to detect depressurization of the aircraft indicating that the aircraft has landed;

enable the gateway wireless transmissions to the sensor nodes and the computing network;

transmit the enable command to the sensor nodes, wherein the enable command instructs the sensor nodes to enable the wireless network transmissions and resume sending sensor data to the gateway device; and forward the sensor data to the computing network.

In one example of the system for monitoring transport of items using a sensor network, the sensor network includes a mesh network in which each sensor node communicates data for the sensor network to other sensor nodes in the sensor network and to the gateway device.

In one example of the system for monitoring transport of items using a sensor network, a sensor device is assigned a unique identifier that is used to track an item.

In one example of the system for monitoring transport of items using a sensor network the sensor nodes include at least one of: a pressure sensor, a GPS (Global Positioning System) sensor, a temperature sensor, a tilt sensor, an accelerometer, a microphone, a magnetometer, or a humidity sensor.

In one example of the system for monitoring transport of items using a sensor network, the system is further configured to identify an airport associated with a current location using GPS data and obtain ambient air pressure data associated with the airport.

In one example of the system for monitoring transport of items using a sensor network, the ambient air pressure data is obtained from a cabin pressure lookup table stored on the gateway device.

In one example of the system for monitoring transport of items using a sensor network, monitoring the cabin air pressure to detect depressurization of the aircraft indicating that the aircraft has landed further comprises determining that the cabin air pressure data is relative to the ambient air pressure data associated with the airport.

What is claimed is:

1. An apparatus for a gateway included in a sensor network, the apparatus comprising:

a memory configured to store instructions; and one or more processors configured to execute the instructions stored on the memory to cause the apparatus to:

in response to detecting an aircraft takeoff preparation event using cabin air pressure data that indicates that an aircraft is preparing for takeoff, (i) transmit a listen command that instructs sensor nodes included in the sensor network to disable wireless network transmissions and to listen for commands transmitted by the gateway, and (ii) disable gateway wireless transmissions to the sensor nodes and to a computing network;

in response to detecting a cruising pressurization event using the cabin air pressure data indicating an altitude that corresponds to a cruising altitude of the aircraft when wireless network transmissions of the sensor nodes are disabled, (i) transmit a low-power command to the sensor nodes included in the sensor network, the low-power command instructing the sensor nodes to enable low-power wireless network transmissions; and (ii) receive and buffer sensor data transmitted from the sensor nodes via the low-power wireless network transmissions; and in response to detecting a landing event using the cabin air pressure data that indicates that the aircraft has landed, (i) enable gateway wireless transmissions to the sensor nodes and the computing network, and (ii) transmit the buffered sensor data received from the sensor nodes to the computer network using the gateway wireless transmissions.

2. The apparatus in claim 1,
wherein the sensor nodes are in proximity to items being transported, and the sensor data is used to track the items and monitor conditions of the items during transport.

3. The apparatus in claim 1, wherein the cabin air pressure data associated with the takeoff preparation event indicates an air pressure increase that corresponds to sealing the aircraft prior to takeoff.

4. The apparatus in claim 1, wherein the cabin air pressure data indicates a landing event when a cabin air pressure corresponds to an ambient air pressure of a destination airport.

5. The apparatus in claim 1, wherein the cabin air pressure data indicates a landing event when a cabin air pressure is equalized with an ambient air pressure.

6. The apparatus in claim 1, wherein the one or more processors are further configured to receive the cabin pressure data from a pressure sensor included in the gateway.

7. The apparatus in claim 1, wherein the one or more processors are further configured to execute the instructions stored on the memory to cause the apparatus to reference air pressure values in a cabin pressure lookup table stored on the gateway to determine that an event has occurred, and
wherein the air pressure values correspond to individual events.

8. The apparatus in claim 7, wherein the cabin pressure lookup table further includes air pressure values associated with airports, and
wherein the one or more processors are configured to execute the instructions stored on the memory to cause the apparatus to determine that an event has occurred using the air pressure values.

9. A computer-implemented method for managing wireless network transmissions during transport using a gateway, comprising:
upon detecting an aircraft takeoff preparation event using cabin air pressure data and accelerometer data, indicating that an aircraft is preparing for takeoff, (i) transmitting a listen command to sensor nodes included in a sensor network, the listen command instructing the sensor nodes to disable wireless network transmissions and to listen for commands transmitted by the gateway, and (ii) disabling gateway wireless transmissions to the sensor nodes and to a computing network;
upon detecting a cruising pressurization event using the cabin air pressure data that indicates an altitude corresponding to a cruising altitude of the aircraft when wireless network transmissions of the sensor nodes are disabled (i) transmitting a low-power command to the sensor nodes included in the sensor network, the low-power command instructing the sensor nodes to enable low-power wireless network transmissions when the cruising pressurization event is detected, and (ii) receiving and buffering sensor data transmitted from the sensor nodes via the low-power wireless network transmissions; and
upon detecting a landing event using the cabin air pressure data that indicates that the aircraft has landed, (i) enabling gateway wireless transmissions to the sensor nodes and to the computing network, and (ii) transmitting the buffered sensor data received from the sensor nodes to the computer network using the gateway wireless transmissions.

10. The method in claim 9, wherein detecting the takeoff preparation event further comprises:
monitoring the cabin air pressure data to detect an increase in cabin air pressure occurring over a time period that indicates the aircraft has been sealed in preparation for takeoff; and
monitoring the accelerometer data to detect movement of the aircraft associated with the aircraft taxiing to a runway.

11. The method in claim 9, further comprising:
upon detecting a descent pressurization event using the cabin air pressure data that indicates a descent of the aircraft in preparation for landing, transmitting the another listen command to the sensor nodes that instructs the sensor nodes to disable the low-power wireless network transmissions and to listen for commands transmitted by the gateway.

12. The method in claim 9, wherein detecting the cruising pressurization event further comprises:
receiving the cabin air pressure data from a pressure sensor; and
determining that the cabin air pressure data meets an air pressure threshold that corresponds to the cruising altitude of the aircraft.

13. The method in claim 9, wherein the landing event is detected by:
monitoring the cabin air pressure data to detect an increase in cabin air pressure corresponding to a decrease in altitude of the aircraft in preparation for landing; and
monitoring the accelerometer data to detect a deceleration of the aircraft that corresponds to a landing of the aircraft.

14. A system for monitoring the transport of items using a sensor network, comprising:
a memory configured to store instructions; and
at least one processor configured to execute the instructions stored on the and memory to:
monitor cabin air pressure data to detect pressurization of an aircraft as part of preparing the aircraft for takeoff;
in response to detecting a pressurization of the aircraft, (i) transmit a listen command to sensor nodes included in the sensor network, the listen command instructing the sensor nodes to disable wireless network transmissions and to listen for an enable command transmitted by a gateway device, and (ii) disable gateway wireless transmissions to the sensor nodes and to a computing network;
in response to detecting a cruising pressurization event using the cabin air pressure data that indicates an altitude corresponding to a cruising altitude of the aircraft when wireless network transmissions of the sensor nodes are disabled, (i) transmit a low-power command to the sensor nodes included in a sensor network, the low-power command instructing the sensor nodes to enable low-power wireless network transmissions when the cruising pressurization event is detected, and (ii) receive and buffer sensor data transmitted from the sensor nodes via the low-power wireless network transmissions; and in response to detecting a landing event using the cabin air pressure data and the accelerometer data that indicates that the aircraft has landed, (i) enable gateway wireless transmissions to the sensor nodes and the computing network, and (ii) transmit the buffered sensor data received from the sensor nodes to the computer network using the gateway wireless transmissions.

15. A system as in claim 14, wherein the sensor network includes a mesh network in which each sensor node communicates data for the sensor network to other sensor nodes in the sensor network and to the gateway device.

16. A system as in claim 14, wherein a sensor node from among the sensor nodes is assigned a unique identifier that is used to track an item.

17. A system as in claim 14, wherein the sensor nodes include at least one of a pressure sensor, a GPS (Global Positioning System) sensor, a temperature sensor, a tilt sensor, an accelerometer, a microphone, a magnetometer, or a humidity sensor.

18. A system as in claim 14, wherein the at least one processor is further configured to execute the instructions stored on the memory to:

identify an airport associated with a current location using GPS data; and obtain ambient air pressure data associated with the airport.

19. A system as in claim 18, wherein the at least one processor is configured to obtain the ambient air pressure data from a cabin pressure lookup table stored on the gateway device.

20. A system as in claim 18, wherein the at least one processor is configured to execute the instructions stored on the memory to monitor the cabin air pressure to detect a depressurization of the aircraft that indicates that the aircraft has landed by determining that the cabin air pressure data relative to the ambient air pressure data associated with the airport.

* * * * *